3,575,894
PROCESS FOR MAKING WATER VAPOR PERMEABLE MICROPOROUS SHEETING
Bruno Zorn, Cologne-Flittard, Harald Oertel, Odenthal-Globusch, and Dieter Dieterich, Leverkusen, Germany, assignors to Farbenfabriken Bayer Aktiengesellschaft, Leverkusen, Germany
No Drawing. Continuation-in-part of application Ser. No. 647,590, June 21, 1967. This application July 22, 1968, Ser. No. 746,253
Claims priority, application Germany, July 22, 1967, F 53,031
Int. Cl. C08g 53/08, 1/20
U.S. Cl. 260—2.5                                    11 Claims

ABSTRACT OF THE DISCLOSURE

A process for producing microporous sheeting permeable to water vapor comprising dissolving from about 90 to about 70 parts by weight of (A) a polyurethane urea having substantially no free NCO groups and from about 10 to about 30 parts by weight of (B) a high molecular weight substantially linear cationic polyurethane having substantially no free NCO groups in (C) a water soluble strongly polar solvent for the polyurethane urea (A), the solvent having a boiling point above about 100° C., said solution containing (E) from about 0.5 to 7% by weight, based on the total solution, of water to yield a solution (D), shaping the solution (D) and extracting the solvent from the resulting product. Solution (D) may either be exposed to moist air in order to effect gelling prior to extracting the solvent with a non-solvent which is miscible with the solvent or may be treated with a solvent/non-solvent mixture, subsequently with further solvent/non-solvent mixtures of decreasing solvent content and finally with pure non-solvent. In this latter mode of operation gelling in moist air may be omitted.

This invention relates to microporous sheeting which is permeable to water vapor and a method for the preparation thereof and is a continuation-in-part of copending application Ser. No. 647,590, filed June 21, 1967, now abandoned.

Foils and sheets which are permeable to water vapor had previously been known in the art and are prepared by treating a solution of a polyether polyurethane in a hygroscopic solvent with moist air and then displacing the solvent with water. However, the foils and sheets thus produced have been unsatisfactory because such a mode of preparation yields uneven results and the products often have a poor surface and little permeability to water vapor.

It is therefore an object of this invention to provide foils, sheets and the like, as well as a process for their preparation, which are devoid of the foregoing disadvantages.

Another object of this invention is to provide microporous sheeting suitable for use as a synthetic leather, as a coating for perforated leather, as a coating for textiles and the like.

A further object of this invention is to provide an efficient process for the preparation of microporous sheeting which will yield substantially uniform products having even surfaces and good permeability to water vapor.

The foregoing objects and others which will become apparent from the following description are accomplished in accordance with this invention, generally speaking, by a process for producing microporous sheeting permeable to water vapor wherein 90 to 70 parts by weight of (A) one or more polyurethane ureas having substantially no free NCO groups and from about 10 to about 30 parts by weight of (B) a high molecular weight substantially linear cationic polyurethane having substantially no free NCO groups are dissolved in (C) a water soluble strongly polar solvent for the polyurethane urea (A) having a boiling point above about 100° C., said solution containing (E) from about 0.5 to about 7% by weight, based on the total solution, of water to yield a solution (D) having a viscosity of from about 1 to about 30 minutes as determined in a Ford viscometer, shaping solution (D) and extracting the solvent from the resulting product. Solution (D) may either be exposed to moist air in order to effect gelling prior to extracting the solvent with a non-solvent which is miscible with the solvent or may be treated with a solvent/non-solvent mixture, subsequently with further solvent/non-solvent mixtures of decreasing solvent content and finally with pure non-solvent. In this latter mode of operation gelling in moist air may be omitted.

If desired, at least about 2.5% by dry weight of a tanning agent, based on the dry weight of (B) may be added to the solution either before it coagulates or else, the gelled product may be treated with an aqueous solution of a synthetic tanning material.

More specifically, the process of this invention comprises dissolving from about 90 to about 70 parts by weight of (A) one or more polyurethane ureas which are substantially free of NCO groups and from about 10 to about 30 parts by weight of (B) one or more high molecular weight substantially linear cationic polyurethanes substantially free of NCO groups which are present in the form of an aqueous dispersion in from about 200 to 2000 parts by weight of (C) a strongly polar water soluble solvent for (A) having a boiling point above about 100° C., so that a solution (D) is formed having a viscosity of from about 1 to 30 minutes measured in a Ford viscometer having a 6 mm. outflow nozzle at 20° C., which solution contains from about 0.5 to about 7% by weight, based on the total solution, of water, shaping solution (D) and extracting the solvent.

The solvent extraction is effected in either one of the following ways:

(1) Solution (D) is exposed to moist air in order to effect a slight solidification (gelling) and subsequently submerged in a non-solvent which is miscible with the solvent.
(2) Instead of a non-solvent a mixture of solvent and non-solvent is used for submerging gelled solution (D). It is subsequently submerged in solvent/non-solvent mixtures of decreasing solvent content and finally in pure non-solvent.
(3) Exposing to moist air is omitted and solution (D) is submerged in a solvent rich solvent/non-solvent mixture and subsequently in solvent/non-solvent mixtures of decreasing solvent content as in (2).

In this process, if desired, a tanning agent may be used at a concentration of at least about 2.5% by weight of the dry substance, based on the dry weight of (B). The tanning agent should be an anionic, synthetic tanning agent and it may be added to (D), either before the solution gels or an aqueous solution of the tanning agent may be used in after-treating the microporous sheet formed.

Even further improved results can be obtained by carrying out the foregoing process if a mixture of the solvent and a non-solvent, preferably water, is used initially instead of water for flushing out the solvent in the extracting or washing step of the described process. The solvent used is preferably dimethylformamide, but may be any suitable solvent as described herein, e.g. dimethylacetamide or dimethylsulfoxide. The product is usually left to stand in moist air for half a minute to 20 minutes to gel after it has been shaped, although this step preferably may be omitted. Several baths of mixtures of solvents and non-solvents, the concentration of solvent decreasing from bath to bath, may be used for flushing out the solvent. The first bath preferably contains about 80% of solvent and 20% of non-solvent and the last bath is exclusively or almost exclusively non-solvent. The non-solvent may be any of the non-solvents described herein but is preferably water.

In the most preferred embodiment of the invention polyurethane urea (A) is used as a fairly concentrated solution, mixed with an aqueous dispersion of (B) and further solvent is added in order to lower the solids content of the solution.

With particular regard to the structure of the polyurethane-ureas (A) of this invention which are substantially free of NCO groups, these materials are prepared by reacting high molecular weight, water-immiscible, substantially linear polyhydroxy compounds having terminal OH groups and a molecular weight between about 500 and about 5000 and, if desired, low molecular weight diols, with diisocyanates to form a prepolymer having at least 0.75% by weight of free NCO groups, and thereafter chain lengthening the prepolymer thus formed in a highly polar, water-soluble solvent having a boiling point above about 100° C. by reacting it with water and/or a bifunctional compound containing hydrogen atoms which are reactive with NCO groups and which are attached to nitrogen atoms.

With particular regard to the structure of the high molecular weight substantially linear cationic polyurethanes (B) of this invention which are substantially free of NCO groups, these materials contain from about 8% to about 35% by weight of urethane groups and, if desired, also urea groupings, and from about 0.5% to about 2% by weight of quaternary ammonium nitrogen atoms. The cationic polyurethanes (B) are used in the form of an aqueous dispersion or colloidal solution having a concentration such that the quantity of water introduced into the final mixture (D) is less than about 7% by weight of the mixture (D).

THE POLYURETHANE-UREAS (A)

The polyurethane-ureas (A) contain, apart from the urethane bonds, the group —R′—NH·CO·NH—, and may also contain such groups as

—R′—NH.CO.NH—R′—

—R′—NH.CO.NH—R—

—R′—NH.CO.NH—NH.CO—R—

—R′—NH.CO.NH—NH.CO.NH—R—

—R′—NH.CO.NH—NH.CO.O—R—

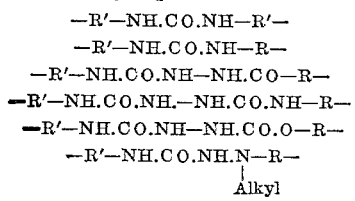

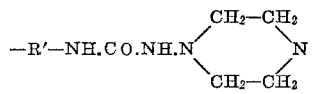

—R′—NH.CO.NH.NH.CO.NH.R′—

—R′—NH.CO.NH.NH.CO.NH.NH.CO.NH.R′— and the like, wherein R′ denotes the difunctional radical derived from an organic diisocyanate such as, for example, from those listed hereinafter, and the radical R denotes a difunctional organic radical derived from a difunctional compound containing hydrogen atoms which are reactive with NCO groups and which are attached to nitrogen atoms.

Such groups are formed when, for example, isocyanate groups are reacted with difunctional chain lengthening agents in which the reactive hydrogen atoms are attached to nitrogen atoms. Some such chain lengthening agents include, for example, primary diamines, hydrazine, carbohydrazide, dihydrazines, dihydrazides, disemicarbazides, dicarbazinic esters and the like. The urea grouping

—R′—NH·CO·NH—R′— is formed when water is used as the difunctional chain lengthening agent.

These elastomeric polyurethane-ureas can be produced by any suitable known method. High molecular weight, substantially linear polyhydroxy compounds having terminal hydroxyl groups and a molecular weight between about 500 and 5000 and, if desired, low molecular weight dihydric alcohols may be first reacted with an excess of diisocyanates to form a prepolymer which has terminal isocyanate groups. This prepolymer may then be reacted under appropriate reaction conditions with water or with difunctional compounds containing hydrogen atoms which are reactive with NCO groups and which are attached to nitrogen atoms. Because isocyanate groups are very highly reactive with these difunctional compounds, the chain lenghtening reaction is carried out in highly polar, water-soluble solvent having a boiling point above 100° C.

The preparation of such polyurethane-urea solutions is described for example, in German patent specifications Nos. 888,766, 1,123,467, 1,150,517, and 1,154,937, German Auslegeschriften Nos. 1,161,007, 1,183,196 and 1,186,618, Belgian patent specification Nos. 649,619, 646,637, 658,363, 664,344, 664,346 and 666,208, French patent specifications Nos. 1,360,082, 1,371,391 and 1,383,077 and U.S. patent specifications Nos. 2,929,803, 2,929,804, and 3,040,003.

Any suitable high molecular weight, water immiscible, substantially linear polyhydroxy compounds containing terminal hydroxyl groups may be reacted with an excess of a diisocyanate to form the prepolymer as described herein. Some such suitable compounds include, for example, polyesters, polyesteramides, polyethers, polyacetals, polycarbonates, poly-N-alkylurethanes and the like and mixtures thereof, including those with ester, ether, amide, urethane, N-alkylurethane groups and the like. The polyhydroxy compounds have molecular weights between 500 and 5000 and melting points preferably below 60° C. and most preferably below about 45° C. in order to preclude the final products from hardening too much at a temperature of about 0° C. since such hardening causes undesirable changes in properties.

Particularly important polyhydroxy compounds are those polyesters prepared from adipic acid and diols or mixtures of dihydric alcohols such as, for example, ethylene glycol, propylene glycol, butane-1,4-diol, 2,2-dimethylpropanediol, hexane-1,6-diol, bis-hydroxymethyl-cyclohexane and the like. Preferably, however, polyesters derived from adipic acid and diols or mixtures of diols having 5 or more carbon atoms are employed since such polyesters have a relatively high resistance to hydrolysis. Polyesters with a narrow range of molecular weights which are obtained by the polymerization of E-caprolactone with diethylene glycol are also suitable for use as starting materials.

Polyurethane-ureas which have excellent resistance to hydrolysis can also be obtained from polyethers, especially polytetramethylene ether diols, which may, if desired, also be used in the form of mixed polyethers. Such mixed polyethers can be prepared, for example, by incorporating small quantities of propylene oxide or epichlorohydrin into the polyether by condensation or by end group modification wherein the OH groups of the ether are replaced, for example, with —O.CO.N(Alkyl).$CH_2$.$CH_2$.OH groups. In order to obtain flame resistant products, one may also use polyepichlorohydrins having terminal OH groups and a molecular weight within the desired range.

Polyhydroxy compounds which are not suitable for the preparation of the polyurethane-urea are those which are miscible with water such as, for example, polyethylene ether diols. These compounds yield polyurethanes which have a high water absorbency and thus undergo swelling in water with loss of porosity.

Any suitable diisocyanate may be used either alone or in mixtures in the preparation of the polyurethane urea. Some such suitable isocyanates including aliphatic, cycloaliphatic, araliphatic, aromatic, heterocyclic diisocyanates and the like. Particularly useful are those diisocyanates which have a symmetrical structure such as, for example, diphenylmethane - 4,4' - diisocyanate, diphenyl-dimethylmethane-4,4'-diisocyanate, 2,2', 6,6'-tetramethyl-diphenylmethane-4,4'-diisocyanate, diphenyl-4,4'-diisocyanate, diphenylether-4,4'-diisocyanate, their alkyl-, alkoxy-, and halogen substituted derivatives, tolylene-2,4- or -2,6-diisocyanate and commercial mixtures of these, diisopropyl-phenylene diisocyanate, m-xylylene diisocyanate, p-xylylene diisocyanate and a,a,a',a'-tetramethyl-p-xylylene diisocyanate, their alkyl or halogen substitution products, dimeric tolylene-2,4-diisocyanate, bis(-3-methyl-4-isocyanatophenyl)-urea, naphthalene-1,5-diisocyanate and the like and mixtures thereof. Aliphatic or cycloaliphatic diisocyanates such as hexane-1,6-diisocyanate, cyclohexane-1,4 - diisocyanate, dicyclohexylmethane-4,4'-diisocyanate, 1-isocyanato-3-isocyanatomethyl - 3,5,5 - trimethylcyclohexane, 2,2,4-trimethyl-hexane-1,6-diisocyanate and the like and mixtures thereof may also be used in calculated proportions and yield products which undergo very little discoloration on exposure to light. Preferably, however, diphenylmethane-4,4'-diisocyanate, isomeric tolylene diisocyanates, and in some cases calculated proportions of hexane-1,6-diisocyanate and dicyclohexylmethane-4,4'-diisocyanate are used since they are readily available commercially and possess particularly desirable properties.

The high molecular weight polyhdroxy compounds are reacted with the diisocyanates to prepare the initial prepolymer in a molar ratio of from about 1:1.125 to about 1:4.0. The prepolymer may be prepared in several stages; in the melt or in any suitable solvent which is inert to isocyanates such as, for example, tetrahydrofuran, dioxane, chlorobenzene and the like, at temperatures of from about 40° to about 130° C., but preferably from about 70° to 100° C. The reaction times should be adjusted so that a substantially linear prepolymer with terminal NCO groups is obtained which, when reacted with about equivalent quantities of bifunctional chain lengthening agents, yields a substantially linear elastomeric polyurethane-urea soluble in highly polar solvents such as dimethylformamide.

If the molar ratio of the polyhydroxy compound in the diisocyanate is 1:2, the reaction between these two compounds will yield a prepolymer in which the diisocyanate is always linked to the polyhydroxy compounds in the terminal position via a urethane bond. If the molar ratio of OH/NCO is increased to a value above 1:2, free diisocyanate will still be present. If on the other hand the OH/NCO ratio is below 1:2, bonding to several polyhydroxy compounds via urethane bonds will first take place. For example, if the ratio is 1:1.5, 2 mols of polyhydroxy compound will be linked to 1 mol of diisocyanate via urethane bonds, and one more diisocyanate will be linked to each end. This reaction may also be carried out in two separate stages. If the polyhydroxy compounds have relatively low molecular weights, e.g. 750 to 1250, the reaction with diisocyanates is preferably carried out at low OH/NCO ratios, for example, from about 1:1.25 to about 1:2.0, whereas with polyhydroxy compounds having high molecular weights, e.g. 1700 to 2500, high OH/NCO ratios, for example, from about 1:1.65 to about 1:3 are to be preferred.

In addition to the higher molecular weight polyhydroxy compounds one may also use any suitable low molecular weight diols having molecular weights preferably below about 250. Some such suitable diols include, for example, ethylene glycol, butane - 1,4 - diol, bis-N,N-(b-hydroxyethyl)-methylamine, bis-N,N-(b-hydroxypropyl)-methylamine, N,N'-bis-hydroxyethyl-piperazine, hydroquinone-bis-(b-hydroxyethyl ether) and the like and mixtures thereof. These and the like diols may be used in quantities of from about 10 to 300 mol percent of the OH content, but preferably 20 to 100 mols percent of the high molecular weight polyhydroxy compound. The use of diols containing tertiary nitrogen has the special effect of increasing the dyeability and improving the fastness to light of the final product, and provides a reactive center for subsequent treatments, such as cross-linking, e.g. with compounds which have a powerful alkylating effect.

The number of NCO groupings (based on solvent-free prepolymer) contained in the prepolymers decisively influences the properties of the resulting polyurethane-ureas. The NCO content must be at least about 0.75% by weight and should preferably be between about 1.00 and about 7.6% by weight, but most preferably between about 1.5 and about 4.0 percent by weight, in order that the polyurethane-ureas formed may have sufficiently high melting points, resistance to tearing, elongations at break and tensile strengths. If the chain lengthening reaction is carried out with water, the NCO content should preferably be higher, e.g. between about 3.5 and about 7.6% by weight, because some of the NCO groups first hydrolyze to amino groups. The chain lengthening agent should have a molecular weight of from about 18 to about 500, but preferably from about 32 to about 350.

Apart from water, any suitable chain lengthening agents may be used either alone or in mixtures. Some such suitable chain lengthening agents include, for example, ethylene diamine, 1,2- and 1,3-propylene diamine, 1,4 - tetramethylene diamine, 1,6 - hexamethylene diamine, 2,2,4 - trimethylhexane - 1,6 - diamine, 1-methylcyclohexane - 2,4 - diamine, 1 - amino- and 3 - aminomethyl - 3,5,5 - trimethyl - cyclohexane, 4,4'-diaminodicyclohexylmethane, bis - (g - aminopropyl) - methylamine, bis - (b - aminoethyl) - oxamide, N,N-bis-(g-aminopropyl) - piperazine; aromatic diprimary amines such as 4,4.' - diamine - diphenylmethane, 4,4' - diaminodiphenylsulphide, 4,4' - diamino - diphenylether, 1-methyl-2,4 - diaminobenzene; araliphatic diprimary amines such as m-xylylene diamine, p-xylylene diamine, a,a,a',a'-tetramethyl - p - xylylene diamine, 1,3 - bis - (b - amino - isopropyl) - benzene, diamines which contain sulphonic acid groups, e.g. 4,4' - diamino - stilbene-2,2'-disulphonic acid, 4,4' - diamino - diphenylethane - 2,2' - disulphonic acid, ethylene diamine - N - butylsulphonic acid, hexamethylenediamine - 1,6 - N - butyl - sulphonic acid, 1,6-hexamethylene - 3 - sulphonic acid, their alkali metal salts and the like; hydrazides such as carbodihydrazide, adipic acid dihydrazide, hydracrylic acid dihydrazide, N-methyl-bis-(propionic acid hydrazide), N,N'-piperazine-bis(propionic acid hydrazide), terephthalic acid dihydrazide, hexamethylene-bis-semicarbazide, butane diol - biscarbazinic ester, aminocaproic acid hydrazide, as well as hydrazine, which may, for example, be in the form of hydrazine hydrate, as well as dihydrazines such as N,N'-diamino-piperazine and the like.

Secondary diamines, preferably those having a symmetrical structure such as piperazine, 2,5-dimethylpiperazine and the like may also be used (but preferably in amounts of less than about 30 mol percent).

The preferred chain lengthening agents for use in the process of this invention are ethylene diamine, m-xylylene diamine, hydrazine, carbohydrazide, water and the like, and these should amount to at least about 50 mol percent and preferably more than about 80 mol percent of the total quantity of chain lengthening agents used. The use of mixtures of chain lengthening agents generally increases the solubility of the polyurethane-ureas and decreases the melting point of the elastomers.

The chain lengthening reaction is carried out in any suitable highly polar, water-soluble solvents which have boiling points above about 100° C. Some such suitable solvents are compounds which contain amide or sulphoxide groups and which form strong hydrogen bonds and include, for example, dimethylformamide, diethylformamide, dimethylacetamide, formylmorpholine, hexamethylphosphoramide, dimethylsulphoxide, mixtures thereof and the like. The preferred solvent for commercial purposes is dimethylformamide. Less highly polar solvents which are not capable on their own of dissolving polyurethane ureas and which include, for example, tetrahydrofuran, dioxane, acetone, glycol monomethyl ether acetate and the like, may also be added to the highly polar amide solvents in proportions which amount to not more than about 33% by weight of the total quantity of solvent. The concentration of elastomer solution (A) should preferably be from about 5 to about 33% by weight, and most preferably from about 15% to about 27% by weight, while the viscosities should preferably lie between about 1 and about 1000 poises, but most preferably from about 50 to about 800 poises/20° C.

The chain lengthening agents generally react very rapidly with the prepolymers to form polyurethane-ureas and the chain lengthening reaction is therefore usually carried out at temperatures below about 100° C., either continuously or batchwise. For example, in the case of the relatively insoluble dihydrazide compounds, the reaction is carried out at from about 50° to about 70° C. although room temperature is usually sufficient, and cooling, e.g. down to about −10° C. may even be necessary when using the very highly reactive aliphatic diamines or hydrazine. It is preferably, however, not to work with free hydrazine or diamines but to use suspensions of carbazinic acids or amino carbonates obtained by the addition of $CO_2$ to the diamines or hydrazine as described in British Pat. 1,055,309 and in British Pat. 1,055,306. In such cases, the reaction can be carried out quite safely at room temperature.

The chain lengthening reaction is carried out with approximately equivalent or slightly excess quantities (e.g. 1 to 20 mol percent excess) of the chain lengthening agent. The greater the excess of the chosen chain lengthening agent, the lower will be the molecular weight of the polyurethane-urea formed. It is possible to adjust the molecular weight or solution viscosity to the desired value by careful addition of other, preferably less reactive, aliphatic di- or tri-isocyanates as disclosed in German patent specification No. 1,157,386. When the desired viscosity has been reached, it can be stabilized by reacting the end groups with monoisocyanates such as butyl isocyanate, or anhydrides or other acylating compounds.

Organic or inorganic pigments, dyes, optical brightening agents, UV absorbing agents, phenolic antoxidants, special light-protective agents such as N,N-dialkylsemicarbazides, N,N-dialkylhydrazides and the like and compounds which have cross-linking effects, e.g. paraformaldehyde melamine hexamethylolether, other formaldehyde, derivatives, and the like, quaternating agents and polyaziridine ureas may be added to the solutions of polyurethane-ureas as desired. Subsequent cross-linking reactions obtained e.g. by the reaction of heat on the product of (A) only alters the resistance to dissolving or swelling in highly polar solvents. Because the polyurethane-urea structure is composed of "soft segments" (polyhydroxy compound) and "hard segments" (the parts of the molecule which can be regarded as built up from diisocyanates and NH chain lengthening agents or water), the polyurethane-urea elastomers obtained have the properties of "cross-linked" elastomers in spite of their substantially linear structure. The "cross-linking" takes place typically by formation of the powerful hydrogen bonds within the "urea segments" —R'—NH.CO.NH. The polyurethane-urea elastomers have a reduced thermoplasticity, higher melting points, higher tensile strengths, higher tension values and higher tear strengths and thus possess great advantages over pure polyurethanes which are obtained by reacting NCO terminated prepolymers with diols which may even have undergone chemical cross-linking. In addition, these elastomers are now only soluble in highly polar solvents such as dimethylformamide or dimethylsulphoxide.

The mechanical properties and elastic properties of films prepared from these polyurethane-urea solutions can be determined on strips or filaments cut from the films. Solutions which are particularly suitable for use in the process of this invention are those from which films having the following properties may be prepared:

(1) Melting point on the Kofler bench of at least 196° C., preferably above 200° C.,
(2) Tear or ultimate tensile strengths of at least about 250 kg./cm.$^2$, preferably 300 to 800 kg./cm.$^2$,
(3) Elongations at break of at least 200%, preferably 400 to 800%,
(4) Tensile forces during the first stretching to 20% of at least 5.0 kg./cm.$^2$, preferably 10 to 30 kg./cm.$^2$; on stretching to 100%, at least 20 kg./cm.$^2$, preferably 45 to 75 kg./cm.$^2$,
(5) A molecular weight such that the viscosity $$\left(\eta_i = \frac{\ln \eta_R}{C}\right)$$

is at least 0.6 and is preferably 0.90 to 1.9 when 1.0 g. of elastomer has been dissolved in 100 ml. of hexamethyl phosphoramide (phosphoric acid tridimethylamide) at 20° C.,
(6) In addition, these polyurea-urethanes should no longer be soluble in only slightly polar solvents such as tetrahydrofuran, dioxane, b-methoxyethyl acetate and the like without degradation but are only soluble in highly polar solvents such as dimethylformamide.

THE CATIONIC POLYURETHANES (B)

Any suitable polyurethanes which contain quaternary ammonium groups in sufficient quantity to impart to the polyurethanes a certain hydrophilic character, and particularly the capacity to form aqueous dispersions or opaque colloidal solutions of molecular associations without the aid of emulsifiers or wetting agents, may be used as component (B) in the practice of this invention.

Such cationic polyurethanes may be prepared in any suitable manner such as, for example, by including at least one component which contains one or more basic tertiary nitrogen atoms in the polyurethane reaction mixture. The resulting polyurethane which thus contains basic tertiary nitrogen atoms is then reacted with alkylating agents or inorganic or organic acids to prepare the cationic product. In carrying out this method, it is immaterial what position in the polyurethane macromolecule the basic nitrogen atoms occupy.

Alternatively one may prepare the cationic polyurethane from polyurethanes which contain reactive halogen atoms which are capable of quaternizing by reacting those quaternizable groupings with tertiary amino groups. Furthermore, the cationic polyurethanes may be prepared by a process of chain building quaternization in which dihalogenurethanes are first prepared by reacting diols (which may be high molecular weight diols) with isocyanates containing reactive halogen atoms, or by reacting diisocyanates with halogen-containing alcohols. The dihalogenurethanes formed are then reacted with ditertiary amines. Conversely, the ditertiary diaminourethane may be prepared by reacting compounds containing two isocyanate groups with tertiary amino alcohols, and then reacting the diaminourethane product formed with reactive dihalogen compounds. The cationic polyurethane composition may also be prepared from a cationic, salt-type starting component such as, for example, a quaternized basic polyether, an isocyanate which contains quaternary nitrogen and the like. These methods, which are known per se, are described e.g. in German Auslegeschriften Nos. 1,184,946, 1,178,586 and 1,179,363 and in Belgian patent specifications Nos. 653,223, 658,026 and 636,799. Suitable starting materials for synthesizing the salt-type polyurethanes are also mentioned therein.

The polyurethane compositions (B) may also contain urea groups in the addition to the urethane groups as described herein.

In order to obtain an end product with satisfactory properties, the polyurethane composition should contain from about 8 to about 35 percent by weight of urethane groups, and urea groups, if desired.

The quaternary ammonium group content of the polymer should be about 0.5 to about 2.0 percent by weight, and preferably from about 0.8 to about 1.8 percent by weight, of the polyurethane composition. Products having a lower salt content are less suitable since they generally give rise to coarse hydrophobic dispersions, which have a precipitating effect on component (A). On the other hand, products which contain substantially more than 2 percent of quaternary nitrogen are to a large extent water-soluble and therefore unsuitable for use in the invention because of their very hydrophilic character.

In carrying out the process of the invention, one should preferably use cationic polyurethanes which have been prepared from high molecular weight polyhydroxy compounds having molecular weights of from about 500 to about 5000, polyisocyanats, a basic chain lengthening agent containing tertiary nitrogen atoms which are preferably aliphatically substituted such as, for example, N-methyldiethanolamine, N,N-bis-(g-aminopropyl)-methyl-amine and the like, and if desired, other, non-basic chain lengthening agents such as dihydric alcohols, diamines, water, hydrazine, substituted hydrazines and the like, although dihydric alcohols are preferred. The predominantly linear cationic polyurethanes composition which is soluble in organic solvents such as dimethylformamadie in the cold, preferably contains 5 to 12% of N-methyldiethanolamine. About 10% to about 60% of the tertiary nitrogen thereby built into the polyurethan composition is quaternized with an alkylating agent such as dimethylsulphate, methylchloromethylether, diethylsulphate, bromoethanol and the like, and from about 30% to about 70% of the tertiary nitrogen present is neutralized with an acid such as hydrochloric acid, lactic acid, acetic acid and the like in the presence of water. As a rule, from about 10% to about 20% of the tertiary nitrogen present is not converted into the salt form.

In order to provide a cross-linked function in the finished microporous sheet structure, one should preferably use at least a certain proportion of aqueous solutions of di- or trifunctional alkylating agents such as dibromobutane, p-xylylene dichloride, 1,3 - dimethyl-4,6-bis-chloromethylbenzene, methylene-bis-bromoacetamide, trimethylolpropane-tris-chloroacetic acid ester, di- or trifunctional acids having pK-values below 4 such as phosphoric acid, oxalic acid, sulphuric acid and the like. These alkylating agents react predominantly monofunctionally tion provide the cross-linked function in the finished microporous sheet structure.

The dispersed polyurethanes may also have groups built into them for the purpose of subsequent cross-linking such as, for example, methylol groups and the like.

Depending on the nature of the reactants and the conditions employed in the preparation of the cationic polyurethane, especially with respect to the quaternary ammonium group content, aqueous colloidal solutions or dispersions having particle sizes of between about 10 and 1000 m$\mu$ are obtained. The dispersions may also still contain organic solvents such as acetone, dimethylformamide and the like in quantities of up to about 50 percent. It is therefore not necessary to remove the solvent used in preparation of the dispersion as described in German Auslegeschrift No. 1,184,946, German Auslegeschrift No. 1,178,586 or Belgian Pat. No. 653,223. Further, one may also use high boiling solvents such as dimethylformamide in the preparation of the dispersions.

The colloidal solutions or dispersions which are free from organic solvents are prepared with as high a solids content as possible, e.g. between about 40% and about 65%, since too high a water content impairs the efficiency of the coagulation process. If the dispersion still contains organic solvents, the solids content may be lower, e.g. from about 25% to about 50%. In any event, the concentration of the dispersion or solution must be sufficiently high to ensure that the quantity of water introduced by it into the finished mixture will be less than about 7% by weight of the finished mixture.

Thus generally speaking, the cationic polyurethanes may be used as an aqueous dispersion or in form of a solution in one of the polar solvents described below. In principle, the cationic polyurethanes could be used as solids. This, however, is difficult as they are usually obtained in dissolved form. If such a solution is used the necessary amount of water must be provided by admixing water either to the cationic polyurethane solution or to the final solution (D), which is defined below. If an aqueous dispersion is used the addition of water is omitted.

THE SOLVENT (C)

Any suitable solvent may be employed as the solvent (C) if it is a water-soluble solvent for polyurethane (A) and if it has a boiling point above about 100° C. Such solvents should preferably contain amide or sulfoxide groups and hence N,N'-dimethylformamide, N,N'-dimethylacetamide, dimethyl sulphoxide, mixtures of these and the like are preferred.

To prepare the mixture from which the microporous sheet is obtained, the aqueous cationic polyurethane dispersion (B) is preferably first diluted with solvents (C), perhaps with the use of a high speed stirrer. The opalescent to slightly cloudy solution which results is then stirred together with polyurethane solution (A). Additional heating to above about 60° C. should be avoided since it is sufficient to stir the solutions together in the cold. The mixture should be left to stand for from about 12 to about 24 hours before the shaping process and gel formation are begun, at which time the mixture may be stirred up again for a short time and after the removal of air, it is ready for use. On the other hand, the mixture may be heated to from about 40° to about 60° C. for from about 10 to about 60 minutes with stirring and can be used immediately after cooling.

THE FINAL MIXTURE (D)

The proportions in which polyurethane (A) and (B) are mixed depends to some extent on the components used but lies within the limits of from about 90% to about 70% by weight, and preferably from about 85% to about 75% by weight of component (A) and from about 10% to about 30% by weight, and preferably from about 15% to about 25% by weight of component (B), calculated as dry substances in each case. The most suitable ratio for obtaining any desired permeability to water vapor can be easily determined by simple preliminary tests. The concentration of the mixture from which the microporous sheet is obtained may vary within wide limits although it is preferred that the mixture contain between about 10% and about 35% by weight of the solid substances. If less highly concentrated solutions are used, the sheet structures obtained on coagulation may have an unsightly surface; if higher concentrations are used, the porosity may diminish. The thicker the solution desired, the more of component (B) should be used in the mixture within the given limits, since the gelling and permeability to water vapor of the microporous sheet are thereby improved.

The concentration of the aqueous dispersion of cationic polyurethane (B) is so chosen that the amount of water introduced into the final polyurethane solution from which the microporous sheet is prepared is less than about 7%, e.g. 0.5 to 7% by weight and preferably only from about 3% to about 5% by weight. For this reason, the aqueous dispersions of (B) should have as high a concentration of cationic polyurethane as possible, e.g. between about 40% and about 60% by weight.

The final solution mixtures thus produced should have a viscosity of from about 1 to about 30 minutes and preferably from about 2 to about 10 minutes at 20° C., measured in a Ford viscometer with an overflow nozzle of 6 mm. The solution should be thoroughly stirred before the viscosity determination is carried out since such solutions are occasionally thixotropic and, if not sufficiently stirred, may form lumps of gel which may give false results for the viscosity.

The usual water-soluble, anionic acid or substantive or basic dyes used for dyeing textiles and leather, and/or organic or inorganic pigments may be added to the final solution mixture. The dyes employed should be soluble in the solvents used in the mixture, although if the desired dyes are not soluble in the solvent, the sheet structure may be dyed in an aqueous bath in the same way as textile fibers after it has completely coagulated and after removal of the solvent by washing, e.g. at from about 50° to about 70° C. Furthermore, up to about 50% by weight, based on the solids content of the mixture, of vinyl polymers such as polyvinyl chloride, polyacrylonitrile, ethylenevinyl acetate copolymers and the like which, in some cases, are partially saponified, may be added to the solution for the purpose of modifying the properties of the finished sheet structure. The solution may then be applied to a porous or non-porous substrate in any suitable manner such as, for example, by painting or pouring the solution onto the substrate, or by applying it with a wiper blade in order to produce the sheet structures and the like. The thickness of the layer applied will depend on the desired final thickness of the sheet, film or foil. Solution thicknesses of from about 0.5 to about 1.5 mm. will generally be sufficient.

Any porous substrate can be used if it is to be coated directly with the polyurethane composition. Examples of some suitable porous substrates are textile fabrics, knitted fabrics, fleeces, felts and the like.

A non-porous substrate, e.g. glass plates, metal bands (with the desired surface structure), webs of textile fabrics coated with plastics such as perfluoropolyethylene and the like, is used when one wishes to obtain porous polyurethane foils which are to be subsequently transferred or glued onto a porous substrate by the usual reversing process. This method may be used e.g. for coating wood, perforated leather, cardboard, paper, woven and non-woven textile sheet structures, brickwork, metal and the like.

In one embodiment the porous or non-porous substrate coated with the solution is then exposed to moist air, preferably a current of moist air, at a temperature of preferably from about 10° to about 40° C. and a relative humidity of from about 60% to 99%, preferably from about 80% to about 98%, until gelling of the solution sets in. This usually occurs after about 1 to 30 minutes, depending on the thickness of the layer and in most cases after about 10 to about 30 minutes. However, it may take longer, especially if the air is static, in which case it may take about 1 to 10 hours. The polyurethane layer does not necessarily become noticeably cloudy during this process although slight solidification, gelling or swelling is observed because the fluidity will have greatly diminished and part of the solvent will have separated. Although the moisture uptake in this state is small, it is sufficient to provide conditions for gelling such that the moisture uptake of the mixed polyurethane solution will be about 2 to 4%, i.e. the water content will rise to more than about 7% by weight, including the quantity of water introduced with the polyurethane dispersion (B) during the preparation of the mixed polyurethane solution. The conditions for gelling and the necessary water uptake depend on the movement of the air and moisture during the gelling process, the components used, the proportions and concentrations in which they are used and the thickness of the solution layer applied. However, the conditions for obtaining a desired specific permeability to water vapor can be easily found for each case by producing small samples with systematically varying the gelling conditions and determining the permeability of each sample.

The composition which has gelled on the substrate is then dipped together with the substrate into a non-solvent to extract the solvent. In the preferred modification of this invention, the gelled mass is dipped together with the substrate into a mixture of the polyurethane solvent and a non-solvent, preferably a mixture of dimethylformamide and water, and the solvent is preferably leached out in successive baths of decreasing solvent concentration. This modification may be carried out by keeping the bath liquids in motion and changing the baths several times and squeezing out the sufficiently solidified film by a known continuous process. During this process, the film may be situated on the substrate or separated from it, depending on the manner in which the process is carried out. Separation of film and substrate is advantageous if the solution of mixed polyurethane has been gelled or coagulated on a non-porous substrate for the purpose of producing a porous film. The time of residence in the first bath should be at least one minute. The ratio of non-solvent, especially water, to solvent is 95:5 to 5:95 parts, preferably 50:50 to 20:80 in the first baths. Non-solvents as understood in this invention are liquids which do not dissolve polyurethane ureas (A) and cationic polyurethanes (B) and do not swell the polyurethanes in question excessively. Preferably no or no appreciable swelling should occur. The preferred agent is water, but other agents, for example methanol, ethanol and others which are known in the art, can be used as well.

When the solvent has been extracted, the porous polyurethane sheet may advantageously be treated with about a 2.5% to 25% aqueous solution of one or more anionic synthetic tanning agents to improve the feel and the permeability of the sheet to water vapor.

In another embodiment of the invention the step of exposing the solution coated to the substrate as described above to moist air in order to effect a slight solidification (gelling) is omitted. In this case the coated solution is dipped into a solvent/water mixture immediately. It is, however, necessary to use a solvent/water mixture which is rich in solvent, e.g. contains about 60% to about 90% by weight of the solvent. This coagulating bath is subsequently replaced by successive baths which contain more and more water and finally by a bath which contains pure water.

Any suitable commercial synthetic anionic tanning agent may be used. Such materials are produced in known manner substantially from substituted or unsubstituted arylsulphonic acids, arylcarboxylic acids, phenols, formaldehyde and the like, in some cases with the use of sulphurous acid or its salts and other compounds which react with formaldehyde. Examples of some suitable compounds which can be reacted with formaldehyde are phenol sulphonic acid, cresol sulphonic acid, naphthalene sulphonic acid, pyrocatechol, phenol, o-chlorophenol, salicylic acid, phenoxyacetic acid, dihydroxydiphenylsulphone, 4,4'-dihydroxydiphenyl dimethylmethane, resorcinol, lignin sulphonic acid, diphenylether sulphonic acid and the like, and these may be used in combination with, for example, urea, naphthalene and the like.

In a particularly preferred embodiment of the invention, the anionic synthetic tanning agent or mixture thereof is dispersed in the mixed poly-urethane solution itself, which solution may also contain dyes. In such cases, the tanning agent is advantageously first dispersed in one of the solvents mentioned under (C). It does not matter whether the tanning agent is present in an acid or neutral form at this stage. The quantity used is generally at least about 2.5% by weight, and preferably from about 5% to about 100% by weight, based on the cationic polyurethane (B) (calculated as dry substances, both for the tanning agent and for the cationic polyurethane). By adding the tanning agent at this stage, the gelling process is accelerated and a substantial increase in the permeability to water vapor of the sheet formed is produced.

When the sheet has been completely coagulated and freed from solvent, it is dehydrated, e.g. by drying. The drying temperature must be below the softening temperature of the polyurethane foil. Temperatures between about 20° and about 100° C., and especially between about 50° and about 70° C. may be used in conjunction with a current of air, or one may employ lower temperatures and reduced pressures.

The dry or still wet but preferably squeeed out sheet products may advantageously be treated with solutions or dispersions of mineral, vegetable or animal oils or polysiloxane oils or any other suitable synthetic products used for greasing leather. This treatment may result in a further increase in the permeability of the sheet to water vapor but, above all, leads to a substantial improvement in its abrasion resistance. In addition, the feel of the film is further improved. These solutions or dispersions may also be introduced into the final mixed polyurethane solution provided they are soluble in it. The preferred proportions to use are between about 1% and about 10% by weight based on the dry weight of the polyurethane mixture.

Some such suitable products which may be employed for these purposes include, for example, paraffin oil, crude or sulphonated sperm oil, neat's foot oil, sulphonated or pure olive oil, coconut fat, castor oil, dimethylpolysiloxane oils, phenylmethylpolysiloxane oils, oleyl alcohol, stearyl isocyanate, reaction products of sulphochlorinated long chained aliphatic hydrocarbons with ammonia or amines and the like.

The sheets, foils or covering layers obtained by the process of this invention may be finished or provided with a dressing to improve their appearance. The individual stages of the process from application of the solution to drying of the foil may advantageously be carried out continuously. The resulting films are particularly suitable for use as artificial leather for shoes, for upholstery, leather bags, coverings and the like.

The invention is further illustrated but is not intended to be limited by the following examples in which all parts and percentages are by weight unless otherwise specified.

METHODS OF PREPARATION FOR POLYURETHANE-UREAS

Polyurethane urea a/1

About 6500 parts of a mixed polyester having an hydroxyl number of 67.75 and prepared from adipic acid and a 65:35 mitxure of 1,6-hexanediol and 2,2-dimethyl-propanediol-1,3 is dehydrated for about one hour at about 130° C./12 mm. Hfi and heated together with about 1713 parts of diphenylmethane-4,4'-diisocyanate (molar ratio of polyester to diisocyanate=1:1.75) to an internal temperature of about 96° C. to about 98° C. with stirring. The reaction mixture is maintained at this temperature for about 70 minutes. About 8000 parts of the hot molten NCO-containing prepolymer (NCO content 3.02%) is introduced into a solution of about 266 parts of carbohydrazide in about 23140 parts of dimethyl formamide heated to about 60° C. to form a homogenous elastomer solution having a viscosity of 234 poises at 26.3% solids concentration. The $\eta_i$ value of a 1.0% solution of the elastomeric substance in hexamethylphosphoramide at about 20° C. is 0.97. The properties of the elastomeric substance (measured on films having a thickness of about 0.15 to 0.20 mm. which are obtained by painting a solution of the elastomer onto glass plates and evaporating off the solvent at about 100° C.) are set forth in Table I.

Polyurethane-urea a/1/I

About 2180 parts of elastomer solution a/1 are stirred together with about 0.5 part of n-butylisocyanate in about 10 parts of dimethyl-formamide at room temperature in order to convert any remaining reactive —CO.NH.NH$_2$ end groups into —CO.NH.NH.CO.NH.C$_4$H$_9$ end groups which are nonreactive with NCO groups at room temperature. No change in solution viscosity takes place even on further addition of polyisocyanates thereto.

Polyurethane-urea a/2

Using a procedure and reactants similar to those described in a/1, about 1600 parts of the mixed polyester are heated to about 96° C. to about 98° C. with about 362 parts (molar ratio 1:1.5) of diphenylmethane-4,4'-diisocyanate for about 60 minutes. About 1304 parts of the molten NCO-containing prepolymer (2.07% NCO) are then stirred into a solution of about 31 parts of carbohydrazide in about 3990 parts of dimethylformamide to produce a 25.1% elastomer solution having a viscosity of 515 poises/20° C.

Polyurethane-urea a/3

About 800 parts of the mixed polyester described in a/1 and about 163 parts of diphenylmethane-4,4'-diisocyanate are heated to about 98° C. for about 30 minutes to form a highly viscous NCO-containing prepolymer which is diluted with about 240 parts of anhydrous dioxane and heated for a further 20 minutes at about 98° C. After cooling, the NCO content of the solution is 1.018% (the NCO content of the solvent-free NCO adduct is calculated from this value to be 1.27%).

About 727 parts of the above-described NCO-containing prepolymer solution are added with intensive stirring to a solution of about 8 parts of carbohydrazide in about 1532 parts of dimethylformamide to produce a homogeneous, clear elastomer solution having a viscosity of 271 poises/20° C. and a solids concentration of 26%.

Polyurethane-urea a/4

About 800 parts of the mixed polyester described in a/1 and having an hydroxyl number of 63.77 are heated together with about 142 parts of diphenylmethane-4,4'-diisocyanate (molar ratio OH/NCO=1:1.25) and about 234 parts of dioxane to an internal temperature of about 96° C. to about 98° C. for about 170 minutes. After cooling to room temperature, the NCO content of the solution, based on the solids content of the NCO-containing prepolymer, is 1.0%.

About 753 parts of the above-described NCO-containing prepolymer solution are stirred into a solution of about 6 parts of carbohydrazide in about 1552 parts of dimethylformamide heated to a temperature of about 50° C. The viscosity rises to about 53 poises. Films prepared from this elastomer have a very low softening point and low tensile and tear strengths.

Polyurethane-urea a/5

About 1200 parts of the mixed polyester used in a/1 are heated together with about 360 parts of diphenylmethane-4,4'-diisocyanate (molar ratio 1:2.0) for about 50 minutes at about 96° C. to about 98° C. (NCO content of the melt 3.48%).

About 635 parts of the molten NCO-containing prepolymer are stirred into a solution of about 26 parts of carbohydrazide in about 1875 parts of dimethylformamide which has been heated to about 50° C. An elastomer solution having a viscosity of 460 poises/20° C. is obtained.

Polyurethane-urea a/6

About 633 parts of the molten NCO-containing prepolymer of a/5 are introduced at room temperature into a suspension of carbazinic acid prepared by the addition of about 15 parts of solid carbon dioxide (carbon dioxide snow) to a solution of about 15 parts of hydrazine hydrate in about 1785 parts of dimethylformamide. A highly viscous elastomer solution (605 poises) is produced within a short time.

Polyurethane-urea a/7

About 800 parts of the polyester used in a/4 are heated together with about 284 parts of diphenylmethane-4,4'-diisocyanate (molar ratio 1:2.5) for about 30 minutes at about 95° C. to about 98° C.

About 350 parts of the resulting NCO melt (5.09% NCO) are introduced into a hot solution of about 21 parts of carbohydrazide in about 1130 parts of dimethylformamide to form a viscous solution (250 poises) which becomes cloudy when permitted to stand for a few minutes.

Polyurethane-urea a/8

About 1000 parts of the mixed polyester used in a/1 and having an OH number at 66.75 are heated together with about 20 parts of N,N-bis-(b-hydroxypropyl)-N-methylamine and about 294 parts of diphenylmethane-4,4'-diisocyanate for about 45 minutes at about 95° C. to about 98° C. About 921 parts of this molten NCO-containing prepolymer (2.78% NCO) are stirred into a solution of about 28 parts of carbohydrazide in about 2778 parts of dimethylformamide, and the elastomer solution (425 poises) is adjusted to a viscosity of 460 poises by the addition of 0.14 part of hexane-1,6-diisocyanate.

Polyurethane-urea a/9

About 1200 parts of a mixed polyester having an hydroxyl number of about 56.3 and prepared from adipic acid and a 1:1 mixture of ethylene glycol and butane-1,4-diol are converted into a molten NCO-containing prepolymer (3.24% NCO) by the addition thereto of about 302 parts of diphenylmethane-4,4'-diisocyanate and heating for about 30 minutes to from about 95° C. to about 98° C.

About 400 parts of the molten NCO-containing prepolymer are introduced at room temperature with intensive stirring into a suspension of aminocarbonates prepared by introducing about 40 parts of solid carbon dioxide into a solution of about 23 parts of m-xylylene diamine in about 1268 parts of dimethylformamide. Carbon dioxide is liberated from the amino-carbonates and a highly viscous, homogeneous elastomer solution is produced which is then diluted with about 150 parts of dimethylformamide until the viscosity is 540 poises/20° C.

Polyurethane-urea a/10

About 430 parts of the molten NCO-containing prepolymer obtained in Example a/9 are heated for a further 130 minutes at about 96° C., by which time the prepolymer has an NCO content of 3.05%. This prepolymer is then mixed with a solution of about 31 parts of 4,4'-diamino-diphenylmethane in about 1460 parts of dimethylformamide. The viscosity of the slightly brownish solution rises in the course of several hours to 516 poises.

Polyurethane-urea a/11

About 800 parts of a polyester of adipic acid and ethylene glycol (OH number 55.25) are heated together with about 249 parts of diphenylmethane-4,4'-diisocyanate (molar ratio 1:2.5) to from about 97° C. to about 99° C. for about 25 minutes. About 600 parts of the molten NCO-containing prepolymer (.465% NCO) are stirred together with a solution of about 6.0 parts of water in about 1794 parts of dimethylformamide. The viscosity of the brownish elastomer solution rises within 48 hours to 44 poises.

Polyurethane-urea a/12

About 400 parts of a polyester of caprolactone and diethylene glycol having a molecular weight of about 825 and produced under the name "Niax 520" by Union Carbide, are heated together with about 167 parts of diphenylmethane-4,4'-diisocyanate (molar ratio 1:1.38) and about 258 parts of dioxane to an internal temperature of from about 95° C. to about 98° C. for about 60 minutes. The solution is thereafter cooled to room temperature and has an NCO content of 2.60% based on the solvent-free NCO-containing prepolymer.

About 538 parts of this prepolymer solution are stirred into a suspension of diamine/$CO_2$ adducts prepared by introducing about 12 parts of solid carbon dioxide into a solution of about 5 parts of ethylene diamine and about 1 part of propylene-1,2-diamine in about 923 parts of dimethylformamide. A highly viscous, colorless elastomer solution (450 poises) is produced with the evolution of $CO_2$ from the carbonates.

Polyurethane-urea a/13

About 800 parts of the mixed polyester used in a/1 are heated together with about 160 parts of hexane-1,6-diisocyanate (molar ratio 1:2.0) at about 98° C. for about 200 minutes. About 637 parts of the NCO-containing prepolymer (4.0% NCO) are mixed with a solution of about 27 parts of carbohydrazide in about 1883 parts of dimethyl acetamide, the viscosity slowly rising to 103 poises/20° C.

Elastomer films obtained by removal of the solvent from the solution by evaporation at about 100° C. have excellent resistance to yellowing and mechanical degradation in the light.

Polyurethane-urea a/14

About 1500 parts of the polyester described under a/1 are heated together with about 294 parts of tolylene diisocyanate (isomeric mixture of 80% 2,4- and 20% 2,6-tolylene diisocyanate) in the molar ratio of 1:1 at about 90° C. to about 96° C. for about 130 minutes to form an NCO-containing prepolymer (2.60% NCO).

About 377 parts of the prepolymer solution are stirred into a solution of about 15 parts of carbohydrazide in about 1140 parts of dimethylformamide to form a viscous elastomer solution (562 poises).

Polyurethane-urea a/15

About 377 parts of the molten NCO-containing prepolymer from a/14 are stirred into a suspension of carbazinic acid prepared by introducing about 20 parts of solid carbon dioxide into a solution of about 9 parts of hydrazine hydrate in about 1077 parts of dimethylformamide. An elastomer solution having a viscosity of 502 poises is obtained.

After removal of the solvent, the elastomers described in a/14 and a/15 undergo substantially less yellowing in light than elastomers containing diphenylmethane-4,4'-diisocyanate as a structural component.

Polyurethane-urea a/16

About 6500 parts of the polyester used in a/14 are heated together with about 128 parts of N,N-bis-(b-hydroxypropyl)-N-methylamine and about 1786 parts of diphenylmethane-4,4'-diisocyanate at about 95° C. for about 50 minutes. The NCO content is 1.92%. About 7365 parts of the molten NCO-containing prepolymer are stirred intensively into a diamino carbonate suspension prepared by the addition of about 250 parts of solid carbon dioxide to a solution of about 119 parts of ethylene diamine and about 16 parts of propylene-1,2-diamine in about 21,365 parts of dimethylformamide at room temperature. A highly viscous elastomer solution (770 poises) is produced within a few minutes after the addition of the prepolymer melt, with the evolution of $CO_2$. About 1.5% of the pentaerythritol ester of 3,5-di-tertiary butyl-4-hydroxyphenyl-g-propionic acid are added to the solution as antioxidant.

Polyurethane-urea a/17

About 800 parts of polytetramethylene ether diol (OH number 109.5) are melted at about 60° C. and stirred together with about 2 parts of about a 35% solution of $SO_2$ in dioxane for about 10 minutes and then heated to about 96° C. at about 12 mm. Hg for about 15 minutes to remove volatile constituents. The polyether pretreated in this way is then reacted with about 294 parts of diphenylmethane-4,4'-diisocyanate and about 276 parts of dioxane for about 80 minutes at about 80° C. About 424 parts of the cooled NCO-containing prepolymer solution (3.0% NCO based on solid NCO) are stirred into a suspension prepared by introducing about 12 parts of solid carbon dioxide into a solution of about 7 parts of ethylene diamine and about 1 part of propylene-1,2-diamine in about 907 parts of dimethylformamide. A homogeneous viscous elastomer solution (468 poises) is obtained within a few minutes.

Polyurethane-urea a/18

About 425 parts of the NCO-containing prepolymer solution obtained in a/17 are stirred into a solution of about 11 parts of carbohydrazide in about 913 parts of dimethylformamide which had been heated to about 50° C. An elastomer solution having a viscosity of 456 poises is obtained.

Polyurethane-urea a/19

About 1200 parts of the polyester used in a/4 are heated together with about 297 parts of tolylene diisocyanate (an 80/20 isomer mixture as described in a/14) for about 2 hours at about 98° C. About 374 parts of the NCO-containing prepolymer melt (5.56% NCO) are introduced into a carbazinic acid suspension prepared by introducing about 15 parts of solid carbon dioxide into a solution of about 13 parts of hydrazine hydrate in about 1087 parts of dimethylformamide. A highly viscous elastomer solution is formed. After dilution with about 138 parts of dimethylformamide, the solution viscosity is 387 poises.

Polyurethane-urea a/20

About 800 parts of the mixed polyester from a/4 are heated together with about 341 parts of diphenylmethane-4,4'-diisocyanate (molar ratio 1:3.0) for about 30 minutes at about 96° C., about 200 parts of the molten NCO-containing prepolymer (6.51% NCO) are stirred together with a solution of about 3 parts of water in about 609 parts of dimethylformamide, the viscosity rising within about 24 hours to 63 poises.

Polyurethane-urea a/21

About 1200 parts of the mixed polyester used in a/1 and having an OH number of about 67.3 are heated together with about 33 parts of butane-1,4-diol and about 400 parts of diphenylmethane-4,4'-diisocyanate to a temperature of about 97° C. for about 30 minutes, about 600 parts of the resulting molten NCO-containing prepolymer (2.32% NCO) are then introduced in a carbazinic acid suspension prepared from a solution of about 9 parts of hydrazine hydrate in about 2150 parts of dimethylformamide and carbon dioxide. An elastomer solution having a viscosity of 435 poises is formed.

Polyurethane-urea a/22

About 1200 parts of the mixed polyester described in a/21 and about 65 parts of butane-1,4-diol are heated together with about 491 parts of diphenylmethane diisocyanate and about 194 parts of dioxane for about 70 minutes at about 98° C. About 635 parts of the NCO-containing prepolymer solution (2.32% NCO based on weight of solids) are introduced into a carbazinic acid suspension of about 9 parts of hydrazine hydrate, about 1582 parts of dimethylforamamide and carbon dioxide. An elastomer solution having a viscosity of 407 poises is formed.

Polyurethane-urea a/23

About 1000 parts of the mixed polyester of a/1 are mixed with about 92 parts of N,N-bis-(b-hydroxypropyl)-N-methylamine and heated together with about 401 parts of diphenylmethane-4,4'-diisocyanate at a temperature of about 90° C. for about 30 minutes. The product obtained is so viscous that the melt must be diluted with about 373 parts of chlorobenzene. After a total reaction time of about 65 minutes, the NCO content of the solution is 1.69% (corresponding to 2.11% NCO based on weight of solids). About 1206 parts of the above-described NCO-containing prepolymer solution are stirred into a solution of about 23 parts of carbohydrazide in about 2712 parts of dimethylformamide. A solution having a viscosity of 397 poises is produced.

Polyurethane-urea a/24

About 550 parts of elastomer solution a/23 are stirred together with about 2 parts of dimethylsulphate in about 10 parts of dimethylformamide and then heated to about 80° C. for about one hour. The viscosity of the solution after this treatment is 125 poises.

Polyurethane-urea a/25

As in a/24, about 2 parts of butane sultone are incorporated into solution a/23; the solution viscosity becomes 76 poises.

Polyurethane-urea a/26

As in a/24, about 1 part of 1,3-dimethyl-4,6-dichloromethylbenzene are added to solution a/23; the solution viscosity becomes 87 poises.

Polyurethane-urea a/27

About 2 parts of dichloromethyldiphenylether are incorporated according to a/24 into solution a/23.

Polyurethane-urea a/28

About 200 parts of the mixed polyester described in a/4 are heated together with about 99 parts of diphenylmethane-4,4'-diisocyanate for about 30 minutes. About 200 parts of the molten prepolymer (7.6% NCO) are stirred with a solution of about 3 parts of water in about 609 parts of dimethylformamide. The viscosity of the cloudy solution which forms rises to 232 poises when the solution is left to stand for some time at room temperature.

PROPERTIES OF POLYURETHANE UREA SOLUTIONS AND FILMS

| Polyurethane urea a | Percent NCO in NCO-containing prepolymer | Concentration of elastomer solution, percent by weight | Viscosity of elastomer solution in poises/20° C. | Tensile strength, kg./cm.² | Elongation at break, percent | Loads At 20% elongation in kg./cm.² | Loads At 100% elongation in kg./cm.² | Smear¹ or melting points² of elastomer films on the Kofler bench | |
|---|---|---|---|---|---|---|---|---|---|
| a/1 | 3.02 | 26.3 | 234 | 669 | 560 | 15 | 56 | 220 | 240 |
| a/2 | 2.07 | 25.1 | 515 | | | | | | |
| a/3 | 1.27 | 26.0 | 271 | 460 | 625 | 8.3 | 21 | 190 | 203 |
| a/4 | 1.01 | 26.3 | 54 | 300 | 800 | 6.9 | 20 | 180 | 196 |
| a/5 | 3.48 | 26.1 | 460 | 750 | 535 | 21 | 80 | 210 | 225 |
| a/6 | 3.48 | 26.5 | 605 | 635 | 546 | 25 | 76 | 252 | 262 |
| a/7 | 5.09 | 24.7 | 250 | | | | | | |
| a/8 | 2.78 | 25.5 | 425 | 625 | 480 | 16 | 61 | 215 | 234 |
| a/9 | 3.24 | 22.5 | 540 | 452 | 652 | 22 | 57 | 251 | 258 |
| a/10 | 3.05 | 24.0 | 516 | 640 | 565 | 25 | 64 | 270 | 270 |
| a/11 | 4.65 | 25.0 | 44 | 605 | 615 | 20 | 53 | 260 | 270 |
| a/12 | 2.60 | 25.7 | 440 | 580 | 555 | 19 | 59 | 232 | 258 |
| a/13 | 4.00 | 25.5 | 103 | 411 | 833 | 25 | 64 | 186 | 200 |
| a/14 | 2.60 | 26.6 | 562 | 740 | 465 | 14 | 46 | 192 | 203 |
| a/15 | 2.60 | 26.1 | 502 | 294 | 550 | 7.4 | 15 | 172 | 196 |
| a/16 | 1.92 | 26.0 | 770 | 682 | 596 | 18 | 48 | 240 | 260 |
| a/17 | 3.00 | 26.0 | 468 | 605 | 645 | 26 | 67 | 252 | 270 |
| a/18 | 3.00 | 26.0 | 456 | 760 | 610 | 23 | 71 | 215 | 228 |
| a/19 | 5.56 | 20.0 | 387 | 880 | 632 | 19 | 69 | 191 | 199 |
| a/20 | 6.51 | 25.1 | 63 | 630 | 602 | 34 | 68 | 260 | 270 |
| a/21 | 2.32 | 22.0 | 435 | 828 | 540 | 15 | 76 | 212 | 239 |
| a/22 | 2.32 | 26.5 | 407 | 670 | 596 | 18 | 48 | 197 | 222 |
| a/23 | 2.11 | 25.5 | 397 | 600 | 505 | 19 | 57 | 205 | 218 |
| a/24 | 2.11 | ca. 25.5 | 125 | | | | | | |
| a/25 | 2.11 | ca. 25.5 | 76 | | | | | | |
| a/26 | 2.11 | ca. 25.5 | 87 | | | | | | |
| a/27 | 2.11 | ca. 25.5 | ca. 125 | | | | | | |
| a/28 | 7.60 | 25.0 | 232 | 925 | 502 | 49 | 106 | 270 | 270 |

¹ The smear point is the region in which the elastomer film undergoes marked softening after two minutes on the Kofler bench becomes easily destroyed and leaves behind a smear trace when shifted with a spatula.

² The melting point is the point at which the elastomer film becomes liquid after two minutes on the Kofler bench.

METHODS OF PREPARATION FOR CATIONIC POLYURETHANES B

Cationic polyurethane b1

About 8000 parts of a polyester having an hydroxyl number of about 64 and prepared from phthalic acid, adipic acid and ethylene glycol (molar ratio 1:1:2.2) and having a water content of less than about 0.3% are reacted with about 2160 parts of tolylene diisocyanate (isomeric mixture 65:35) for about 90 minutes at about 100° C. About 3950 parts of acetone (water content 0.24%), about 800 parts of N-methyl-diethanolamine and a further about 3500 parts of acetone are added successively to the resulting viscous prepolymer and stirred at about 50° C. until the viscosity is 20 poises. A solution of about 244 parts of 1,3-dimethyl-4,6-bis-chloromethyl benzene in about 790 parts of acetone is then added and this is followed by about 3500 parts of acetone. When the viscosity reaches 40 poises, about 80 parts of dibutylamine in about 126 parts of acetone, about 277 parts of 85% phosphoric acid, about 106 parts of triethylphosphate in about 1000 parts of water and about 14,000 parts of water are stirred in successively. After removal of the acetone by distillation, an opaque, viscous, colloidal, 52% polyurethane solution is obtained.

Cationic polyurethane b2

About 500 parts of the polyester used in b1 are stirred together with about 231 parts of tolylene diisocyanate (isomeric mixture 65:35) for about 60 minutes at about 90° C. A solution of about 40 parts of butane-1,4-diol and about 60 parts of N-methyldiethanol in about 240 parts of acetone (water content 0.24%) is added to the prepolymer after it is cooled to about 30° C. After stirring 60 minutes at about 50° C., about 320 parts of acetone are added and the mixture is then diluted with about 460 parts of acetone after about another 2 hours. The 45% polyurethane solution to which about 5 parts of methanol are added is stable on storage. About 600 parts of this solution are stirred together with about 1 part of dimethylsulphate and about 3 parts of 1,3-dimethyl-4,6-bis-chloromethyl-benzene for about one hour at about 55° C. After the addition of a solution of about 6 parts of acetic acid, about 4 parts of 85% phosphoric acid and about 0.3 part of triethylphosphate in about 30 cc. of water, about 500 parts of water are stirred into the mixture and the acetone is distilled off in vacuo. About 730 parts of an opaque, aqueous colloidal 38% polyurethane solution are obtained. The product can still be used after about 3 months' storage.

Cationic polyurethane b5

About 250 parts of a polythioether having an OH number of 77 and obtained from reacting about 70% of thiodiglycol with about 30% of hexane-1,6-diol, are heated together with about 517 parts of tolylene diisocyanate at about 80° C. for about 45 minutes. When the mixture has cooled to about 30° C., about 100 parts of butane-1,4-diol, about 50 parts of diethylene glycol and about 131 parts of N-methyl-diethanolamine in about 310 parts of acetone are added within about 30 minutes with cooling. When stirred at about 50° C., the solution rapidly becomes viscous. About 310 parts of acetone are added after about 30 minutes. The 45% solution has a viscosity of about 250 poises.

About 600 parts of this solution are stirred together with about 3 parts of dimethylsulphate and about 1 part of 1,3-dimethyl-4,6-bis-chloromethyl-benzene for about one hour at about 50° C. About 500 parts of water are stirred in after the addition of a solution of about 10 parts of acetic acid, about 2 parts of 85% phosphoric acid and about 0.3 part of triethylphosphate in about 16 parts of water, and the acetone is distilled off in vacuo. About 800 parts of an opaque 35% polyurethane dispersion are obtained. The product can still be used after about 3 months' storage.

Cationic polyurethane b4

About 250 parts of the polyester described in b1 are stirred together with about 365 parts of tolylene diisocyanate (isomeric mixture 65:35) for about 45 minutes at about 80° C. A solution of about 150 parts of diethylene glycol and about 60 parts of N-methyl-diethanolamine in about 320 parts of acetone (water content about 0.24%) is added to this mixture when cooled to about 30° C. About 30 minutes later, about 220 parts of acetone are added to the solution and stirred at about 50° C., and another about 300 parts of acetone are added after about 35 minutes. A 50% polyurethane solution is obtained which has a viscosity of 120 poises.

About 800 parts of this solution are heated with about 3 parts of 1,3-dimethyl-4,6-bis-chloromethylbenzene at about 50° C. for about one hour. After the addition of a solution of about 7 parts of phosphoric acid (85%) in about 100 parts of water, about 500 parts of water are stirred in and the acetone is distilled off in vacuo. A 48% polyurethane latex is obtained.

Cationic polyurethane b5

The same procedure is carried out as in b4 but with the use of about 6 parts of phosphoric acid. The dispersion obtained is slightly coarser than that obtained in b4 and can be easily concentrated to a solids content of 57%.

Cationic polyurethane b6

The procedure is carried out as described in b1 but with the use of a polyester of adipic acid, hexanediol and neopentyl glycol (molar ratio 15:11:6) instead of the polyester of phthalic acid, adipic acid and ethylene glycol used therein. A 50% aqueous dispersion of the corresponding polyurethane is obtained.

Cationic polyurethane b7

The procedure is the same as carried out in b1, except that a polyester of adipic acid, butane-1,4-diol and ethylene glycol (molar ratio 5:3:3) is used instead of the polyester of phthalic acid, adipic acid and ethylene glycol used therein. A 41% aqueous polyurethane dispersion is obtained.

EXAMPLES OF THE PROCESS OF THE INVENTION

Example 1

(a) About 586 parts of a 26.6% solution in dimethylformamide of the polyurethane obtained in a/1 and heated to about 50° C., are thoroughly stirred together with about 223 parts by weight of a solution of about 89 parts of a 50% aqueous dispersion of the cationic polyurethane b1 and about 134 parts of dimethylformamide. The mixture is adjusted to a 20% solids content with about 191 parts of dimethylformamide (1000 parts of mixture; proportion by weight of the two polyurethanes 78:22).

(b) Films of this solution, each 1.3 mm. in thickness, are applied by a wiper blade to 8 glass plates, and each is immediately inserted, without gelling, into a mixture of water and dimethylformamide in the proportions listed for each in the following table and then introduced into a second bath of water after about 10 minutes. Each sample is left in the second bath for about 20 minutes and then squeezed off 5 times, being saturated with water between each squeezing, and dried at about 65° C. The resulting films have the permeabilities to water vapor listed in the following table:

| 1st bath, DMF, percent: | Permeability to water vapor, (IUP 15), mg./cm.$^2$·h. |
|---|---|
| 0 | 0.6 |
| 20 | 3.0 |
| 30 | 2.2 |
| 40 | 3.3 |
| 50 | 4.2 |
| 60 | 5.3 |
| 70 | 3.4 |
| 80 | 12.3 |

The above test was repeated on 7 glass plates, but a 10% dimethylformamide solution in water is used as a second bath after about 10 minutes, and water is used as a third bath, after about 20 minutes with the following results:

| 1st bath, DMF, percent | 2d bath, DMF, percent | Permeability to water vapor, (IUP 15) mg./cm.$^2$/h. |
|---|---|---|
| 20 | 10 | 3.9 |
| 30 | 10 | 2.3 |
| 40 | 10 | 4.4 |
| 50 | 10 | 2.6 |
| 60 | 10 | 8.4 |
| 70 | 10 | 7.8 |
| 80 | 10 | 21.0 |

(c) About 500 parts of the mixture $a$ (water content 4.5%) are heated to about 55° C. for about one hour with stirring in a closed glass vessel equipped with reflux cooler and stirrer, and then cooled. Immediately after stirring and evacuation in vacuo, the outflow time measured in a Ford viscometer having a 6 mm. outflow nozzle at 20° C., is 3 minutes 30 seconds.

About 200 parts of this solution are applied to about a 1870 cm.$^2$ glass plate by means of a wiper blade and then exposed for about 20 minutes to a current of air at a relative humidity of 85% (23° C.), by the end of which time the solution has gelled. The dimethylformamide is then extracted with water for about 2 hours. After rinsing in water for another 16 hours, the resulting porous foil is treated for about one hour in a 5% aqueous solution of a neutralized commercial synthetic tanning agent at from about 40° to about 50° C. The commercial synthetic tanning agent is obtained from naphthalene sulphonic acid, dihydroxydiphenylsulphone and formaldehyde as described in German Pat. No. 611,671. The process for preparing such tanning agents is illustrated by Example 1 of that reference wherein 100 parts of the sulphonation mixture obtained by heating for several hours 520 parts of naphthalene with 560 parts of concentrated sulphuric acid at 140–160° C. until the mass is soluble in water, are heated together with 100 parts of a dihydroxydiarylsulphone (for instance one obtained by heating for 3 hours 540 parts of phenol with 180 parts of fuming sulphuric acid of 60 percent strength at 170–180° C. and then distilling off the excess of phenol), 50 parts of water and 45 parts of formaldehyde of 30 percent strength, for about 1 hour at 105–110° C. The product is soluble to a clear solution in water; for tanning, the product is made feebly acid by addition of alkali lye and is made up with water to a solution of specific gravity 25° Bé. The solution has a strong capacity for precipitating gelatine, analogously to the vegetable tanning agents; it yields a strong precipitate with ferric chloride and the dissolved product can be salted out by means of common salt.

The foil is then rinsed in water (18° C.), squeezed out and steeped in a non-ionogenic commercial 10% emulsion of a methyl-polysiloxane oil (viscosity 1400 cst. at 20° C.) and then dried overnight at about 20° C. The white foil is then introduced into a solution heated to about 55° C., of about 3% (based on the weight of the foil of the dye Acid Brown 85 (Color Index No. 34900) in about 5000% water, and is left to stand for about one hour during which time it is kept in motion. About 10% (based on the weight of the foil) of 60% formic acid is then added; the foil is left for another about 30 minutes in the bath and then rinsed thoroughly and dried at about 25° C.

The foil has an excellent leather-like appearance, a good feel and permeability to water vapor (according to IUP 15, "Das Leder" 1961, pp. 86–88) of 19.7 mg./cm.$^2$/h. [mg./cm.$^2$/h. means milligram per square centimeter in 1 hour].

The foil is now divided up and part of it is glued onto a piece of perforated leather while the other part is glued onto the smooth surface of a velveteen fabric. The adhesive used is a mixture of polyurethane and polyisocyanate in ethyl acetate and it can be sprayed in the form of fine filaments onto each side of the foil and of the support.

After adhesion, the top surface of the foil is dressed with several applications of a pigmented 8% aqueous dispersion of polyurethane b1 and is dried and pressed between each application as is customary for leather. The product obtained is deceptively similar to leather in appearance and feel. After adhesion and dressing, the values for permeability to water are 4 and 2 mg./cm.$^2$/h. respectively.

(d) A dispersion of about 2 parts (7% based on the cationic polyurethane) of a commercial synthetic tanning agent in the form of a powder (sulphomethylated condensation product of dihydroxydiphenylsulphone and formaldehyde) and about 95 parts of dimethylformamide are stirred into about 500 g. of the polyurethane solution described at the beginning of Example 1. The tanning agent should preferably be dissolved first in the solvent at about 40° C. and the solution cooled before addition to the polyurethane. About 0.2 part of one of the following dyes are optionally stirred into the polyurethane solution (water content 3.7%) containing the tanning agent: Acid Blue 109 (Color Index 42740), Acid Violet 21 (Color Index 42580), Acid Orange 10 (Color Index 16230), Acid Black 1 (Color Index 20470), Acid Green 26 (Acid Yellow 141), Direct Red 23 (Color Index 29160), Acid Black 2 (Color Index 50420), Basic Brown 1 (Color Index 21000), Acid Brown 83. This colored solution is left to stand for about 16 hours and stirred. Its outflow viscosity is then found to be 3 minutes 50 seconds (Ford viscometer, 6 mm. nozzle).

A layer of this colored solution is poured in a thickness of about 1.2 mm. over an area of about 1420 cm.$^2$ of a textile foil which has been coated with polyperfluoroethylene, and the layer is then exposed to a current of air at a temperature of 24° C. and relative humidity 85% for about 10 minutes. By the end of that time, the solution has gelled, i.e. it becomes much thicker, it sets thixotropically and some dimethylformamide becomes deposited on the surface. The film together with the support is now extracted with water for about 10 minutes, after which the film can be easily stripped from the substrate. The film is then rinsed in water for about another 5 minutes and squeezed out about 4 times, being steeped in water between each squeezing. After the fourth squeezing, the white foil is dipped into a commercial emulsion containing about 35% of methyl polysiloxane oil (1440 cst. viscosity) which has been diluted with water at a ratio of about 1:4, and is then dried in a current of air at about 60° C.

The dyed porous foil has a permeability to water vapor of 24.4 mg./cm.$^2$/h.

Example 2

In an apparatus similar to that used in Example 1(a), about 6 parts of Acid Brown 83 (Color Index 20250) are dissolved in about 200 parts of dimethylformamide and added to about 700 parts of a 26.6% solution of polyurethane-urea a1 in dimethylformamide and about 170 parts of a mixture of about 66 parts of about a 50% aqueous dispersion of cationic polyurethane b1 dispersed in about 104 parts by weight of dimethylformamide (ratio by weight of polyurethanes 85:15). This mixture is stirred thoroughly and, at the same time, a solution of about 2 parts of the synthetic tanning agent described in Example 1(b) and dissolved in about 58 parts of dimethylformamide (at a temperature of about 50° C.) is run in (tanning agent is about 5% of the cationic polyurethane). The vessel containing the mixture is exposed to air heated to about 60° C. for about one hour. After two weeks' storage at from about 20° to about 22° C., the Ford viscosity (6 mm. nozzle) measured after thorough stirring is 8 to 9 minutes at 20° C. (whereas, without stirring, it is 18 to 20 minutes). A film prepared from this mixture by the method described in Example 1(b) has a permeability to water vapor of 20.3 mg./cm.$^2$/h.

Example 3

Mixtures of polyurethane-urea prepared as described in a1 and the aqueous polyurethane dispersion b1 (proportion by weight of the two polyurethanes 80:20) in dimethylformamide are prepared as described in Example 2 and the various quantities of the synthetic tanning agent mentioned in Example 1 (dispersed in dimethylformamide) are added. Porous foils are produced from the resulting mixtures (water content 2 to 3.6%) by the method of Example 2 without the addition of dyestuffs but with the polysiloxane treatment, and their permeability to water vapor is determined after drying.

| Percent synthetic tanning agent (based on polyurethane b1) | Viscosity of solution (Ford viscometer 6 mm.) | Foil thickness, mm. | Permeability to water vapor, mg./cm.$^2$/h. |
| --- | --- | --- | --- |
| 25 | 5 minutes | 0.1 | 12.5 |
| 50 | 4½ minutes | 0.1 | 13.5 |
| 100 | 3½ minutes | 0.1 | 9.6 |
| 200 | 2⅙ minutes | 0.15 | 14.2 |
| 400 | 50 seconds | 0.1 | 16.2 |

Example 4

A 20% solution of polyurethane-urea a1 and aqueous polyurethane dispersion b1 (proportions by weight 78:22) of the polyurethanes (calculated as solid substance) in dimethylformamide is prepared by a method analogous to that used in Example 1. Foils are prepared according to the procedure described in Example 1(a). Gelling is effected in one to two hours without the use of a current of air. Some of these foils are treated with 10% aqueous solutions of the following synthetic tanning agents at from about 50° to about 55° C. for about one hour:

(a) Tanning agent used in Example 1(a) but acidified with acetic acid;
(b) Tanning agent used in Example 1(a) (neutral);
(c) Tanning agent used in Example 1(b);
(d) Commercial tanning agent as described in German Pat. No. 870,268, based on a condensation product of pyrocatechol, formaldehyde and naphthalene sulphonic acid. The process for preparing such commercial tanning agents is illustrated by Example 1 of German Pat. No. 870,268 in which 100 parts by weight of pyrocatechol, 100 parts by weight of crude naphthylene sulphuric acid (prepared by heating 144 parts by weight of β-naphthol and 144 parts by weight of acidic acid for about one hour at 123° C.), 100 parts by weight of water and 90 parts by weight of formaldehyde, 30 percent technical grade, are heated for two hours under reflux at 95–100° C. The water soluble condensation product was neutralized with ammonia and with acetic acid to a pH of 3.5.
(e) Tanning agent. A process for preparing such tanning agents is illustrated by Example 1 of the French patent wherein a mixture of 138 parts by weight of salicylic acid, 128 parts by weight of naphthalene, 200 parts by weight of 30 percent (wt.) formaldehyde and 300 parts by weight of 37 percent (wt.) hydrochloric acid are heated with stirring to the boiling point of the mixture and then refluxed with stirring for 3 hours. A resin separates in the course of the reaction which becomes more and more viscous. After completion of the condensation, the hot resin is separated and washed with hot water prepared from phenol sulphonic acid, formaldehyde, urea and phenol formaldehyde in a two-stage reaction;
(f) Tanning agent as described in French Patent No. 76,053, addition to No. 1,201,979, based on a condensation product of salicylic acid, naphthalene, formaldehyde and sulphite waste liquor. A process for preparing such tanning agents is illustrated by Example 1 of the French patent wherein a mixture of 138 parts by weight of salicylic acid, 128 parts by weight of naphthalene, 200 parts by weight of 30 percent (wt.) formaldehyde and 300 parts by weight of 37 percent (wt.) hydrochloric acid are heated with stirring to the boiling point of the mixture and then refluxed with stirring for 3 hours. A resin separates in the course of the reaction which becomes more and more viscous. After completion of the condensation, the hot resin is separated and washed with hot water.

(g) Tanning agent based on a condensation product of diphenylether sulphonic acid, formaldehyde and salicylic acid.

Part of the foils are then treated with the methyl polysiloxane oil emulsion mentioned in Example 1(a). All the foils are stretched over boards while still moist, to dry them. The foils are found to have the following values of permeability to water vapor.

| Tanning agent used for after-treatment | Polysiloxane oil treatment | Permeability to water vapor, mg./cm.²/h. |
|---|---|---|
|  |  | 0.2 |
|  | Yes | 0.28 |
| a |  | 12 |
| a | Yes | 124 |
| b |  | 12 |
| b | Yes | 12 |
| c |  | 1 |
| c | Yes | 22 |
| d |  | 2 |
| d | Yes | 11 |
| e |  | 2 |
| e | Yes | 10 |
| f |  | 8 |
| f | Yes | 12 |
| g |  | 9 |
| g | Yes | 17 | thickness of 1.3 to 1.4 mm. and stored for about 2 hours at about 32° C., 90% to 95% relative humidity. They are then steeped in water for about 20 hours. After drying while suspended on nails at about 25° C., the foils are found to have the following permeabilities to water vapor: (a)=14 mg./cm.²/h, (b)=13 mg./cm.²/h.

Example 6

About 100 parts by weight of the 20% polyurethane solution used in Example 5 heated to about 50° C. are stirred together with a dispersion of about 4 g. of the synthetic tanning agent used in Example 1(b) in about 37 parts by weight of dimethylformamide, which is also at a temperature of about 50° C. (Ford viscosity, 6 mm. nozzle at 20° C., 5 minutes). This mixture is painted at a thickness of about 1.5 mm. onto a fleece of 1.2 den. polyamide threads which are about 5 cm. long and which have been stitched, shrunken and bonded with a latex of a copolymer of butadiene, acrylonitrile and methacrylic acid, and which has a weight of about 500 g./m.² The coated fleece is stored for about 1½ hours at about 24° C. and from about 95% to 97% relative humidity, rinsed in water for about 18 hours and then steeped in about a 4% polysiloxane emulsion as described in Example 1(a). The coated fleece is then dried while stretched, at from about 40° to about 50° C. The permeability to water is 8 mg./cm.²/h.

Example 7

Example 1(a) is repeated but the ratio of polyurethane-ureas of a1 and aqueous polyurethane dispersion is varied:

| Proportions by weight of polyurethanes according to methods a1:b1 (calculated as solid substance) | Ford viscosity 6 mm. nozzle, min. | Concentration of solution, weight percent | Water content of solution before gelling, weight percent | Permeability to water vapor, mg./cm.²/h. |
|---|---|---|---|---|
| 95:5 |  | 19.8 | 1.0 | Less than 0.1. |
| 90:10 | 5½ | 19.5 | 2.0 | Foil is non-uniform with varying permeabilities to water vapor. |
| 85:15 | 7–8 | 20.0 | 3.0 | 7. |
| 80:20 | 9–10 | 20.0 | 4.0 | 14. |
| 75:25 | 16–23 | 20.0 | 5.0 | 19. |
| 70:30 | 6–8 | 17.0 | 5.1 | 22. |
| 60:40 |  | 16.0 | 6.4 | Film dissolves when steeped in water. |

It is clear from the foregoing data that when this polyurethane combination and procedure are employed, the permeability to water vapor of the resulting microporous sheet is greatly increased by the treatment with tanning agent and further increased by the polysiloxane treatment.

Example 5

In a glass apparatus equipped with stirrer, dropping funnel and reflux cooler, a mixture of about 15 parts of dimethylformamide, about 15 parts of about a 50% aqueous dispersion of cationic polyurethane b1 (proportion by weight of polyurethanes 78:22) and a further about 32 parts of dimethylformamide is added to about 100 parts of about a 26.6% solution of polyurethane urea a1 in dimethylformamide at about 60° C., with stirring. The 20% solution is then divided into two equal parts, each of which totals 81 parts. One part is mixed with (a) 1.6 g. (=10% of polyurethanes) of a commercial synthetic leather dubbing agent based on paraffin sulphochlorides reacted with ammonia as described in German Pat. No. 767,853 and the other part is mixed with (b) 1.6 g. of a commercial natural leather dubbing agent based on a sulphonated sperm oil (Ford viscosity, 6 mm. nozzle, (a)=25 minutes, (b)=29 minutes). The two solutions are applied onto two glass plates in layers having a Example 8

As in Example 1, the polyurethane-urea solutions given in the following table are mixed in the proportions given in the table with the aqueous dispersion of cationic polyurethane b1 dispersed in dimethylformamide, and the mixture is diluted to the given concentration with dimethylformamide. The Ford viscosities are less than 10 minutes in all cases. Samples of the solution are then poured onto glass plates at thicknesses corresponding to about 1500 g./m.², and the coated glass plates are then placed in a closed box provided with small apertures, in which they are exposed to a current of moist air (20° C., 90% to 95% relative humidity for one hour, 0.5 atmosphere above atmospheric pressure when introduced). They are then coagulated in water and some of the foils are treated with a 10% solution of a synthetic tanning agent as described in Example 1(a) or 1(b) (tanning agent indicated in table as (a) or (b) for one hour at from about 35° to about 40° C. Some of the foils are steeped in the siloxane oil emulsion described in Example 1(a). After drying at about 50° C. in a circulating air drying cupboard, the foils are found to have permeabilities to water vapor as indicated in the following table:

| Polyurethane-urea solution according to method No.— | Ratio of polyurethane of column 1:b1 | Concentration of finished solution | After-treatment with tanning agent | After-treatment with silicone oil | Permeability to water vapor/ mg./cm.²h. |
| --- | --- | --- | --- | --- | --- |
| a2 | | 18 | — | — | 0.1 |
| a2 | 78:22 | 18 | — | — | 5 |
| a2 | 78:22 | 18 | a | — | 12 |
| a1/I | | 20 | — | — | 0.5 |
| a1/I | 78:22 | 18 | b * | — | 16 |
| a8 | | 20 | b * | + | 0.1 |
| a8 | 78:22 | 18 | — | — | 16 |
| a12 | | 26 | b | — | 0.9 |
| a12 | 78:22 | 20 | b | — | 12 |
| a9 | | 23 | — | — | 0.1 |
| a9 | 78:22 | 20 | — | — | 10 |
| a9 | 78:22 | 20 | a | — | 13 |
| a9 | 78:22 | 20 | b | + | 17 |
| a11 | | 25 | — | — | 5 |
| a11 | 78:22 | 25 | — | — | 15 |
| a13 | | 26 | — | — | 3 |
| a13 | 78:22 | 20 | — | — | 22 |
| a18 | | 26 | — | — | 0.1 |
| a18 | 78:22 | 15 | — | — | 17 |
| a17 | | 20 | — | — | 0.1 |
| a17 | 78:22 | 14 | — | — | 17 |
| a24 | | 24 | — | — | 0.1 |
| a24 | | 20 | a * +5% H₂O | — | 0.1 |
| a24 | 78:22 | 17 | — | — | 17 |
| a25 | | 20 | — | — | 0.1 |
| a25 | | 20 | a * +4.5% H₂O | — | 0.1 |
| a25 | 78:22 | 17 | — | — | 12 |
| a26 | | 20 | — | — | 0.1 |
| a26 | | 20 | a * −4.5% H₂O | — | 0.1 |
| a26 | 78:22 | 17 | — | — | 14 |
| a27 | | 20 | — | — | 0.1 |
| a27 | | 20 | a * +4.5% H₂O | — | 0.1 |
| a27 | 78:22 | 17 | a | — | 10 |
| a23 | | 24 | a | — | 0.1 |
| a23 | 78:22 | 20 | a | — | 12 |
| a15 | | 20 | — | — | 0.1 |
| a15 | 71:29 | 20 | — | — | 20 |
| a10 | | 24 | — | — | 1 |
| a10 | 71:29 | 17 | a | — | 12 |
| a3 | | 26 | — | — | 2 |
| a3 | 78:22 | 18 | — | — | 18 |
| a6 | 78:22 | 18 | — | — | 18 |
| a6 | 78:22 | 18 | a | — | 20 |
| a21 | 78:22 | 18 | a | — | 15 |
| a22 | 78:22 | 20 | — | — | 8 |
| a22 | 78:22 | 20 | a | — | 14 |

The ratio given in column 2 is the proportion by weight of polyurethanes calculated as dry substance. In column 4 (*) indicates that the tanning agent has already been added to the polyurethane solution (10% based on cationic polyurethane). The water content introduced into the solutions with the cationic polyurethane dispersions is between 3.1% and 5.6%.

In three cases (see column 4 of table), water is added in a quantity corresponding to that which is introduced in the comparison test by the addition of the dispersion of cationic polyurethane. It will be seen that the permeability to water vapor is not affected by this water but depends only on the cationic polyurethane.

Example 9

Polyurethaneurea solutions in dimethylformamide obtained in methods a5, a16, a19 and a 28 are mixed with dispersions of about 60% dimethylformamide and about 40% of the aqueous cationic polyurethane dispersion of b1. The mixing ratio of the polyurethanes is 78:22 (weight). The mixtures are adjusted to the concentrations given in the table by means of dimethylformamide. The dimethylformamide required for dilution may contain 100 percent, based on the cationic polyurethane, of a pulverulent tanning agent dispersed in dimethylformamide as mentioned in Example 1(a).

The amount of water introduced with the cationic polyurethane dispersion amounts to 3.3% to 4% in the final mixture. The mixtures are applied on glass in about 1 mm. thick layers, gelled for about 30 minutes at about 29° C. in a current of air 90% to 95% relative humidity, steeped in water for about 30 minutes, detached from the support and left in water for about 16 hours. The foils are then dried at about 60° C. The foils are 0.1 to 0.2 mm. thick. The viscosity indicated in the table is measured with a Ford viscometer with 6 mm. nozzle.

| Polyurethane urea according to method No.— | Concentration of mixture, percent | Tanning agent added | Viscosity (20° C.), min. | Permeability to water vapor, mg./cm.²/h. |
| --- | --- | --- | --- | --- |
| a5 | 14.8 | Yes | 6 | 18 |
| a16 | 18 | | 11 | 17 |
| a19 | 14.8 | Yes | 4–5 | 11 |
| a28 | 18 | | 10 | 23 |

Example 10

About 125 parts of the 26.6% polyurethane urea solution in dimethylformamide obtained in method a1, and about 20 parts of a 48.4% aqueous dispersion of the polyurethane obtained in method b4, dispersed in about 63 parts of dimethylformamide are mixed and a dispersion of about 30 parts of dimethylformamide and about 915 parts of the pulverulent tanning agent used in Example 1(a) are carefully stirred into the mixture. After several hours, the viscosity measured in a Ford viscometer with 6 mm. nozzle, after first stirring the solution, is found to be 7½ minutes.

This solution is applied to a glass plate in a thickness of 1 mm. after about 3 days, gelled for about 30 minutes at about 30° C. and 90% relative humidity, coagulated in water at about 20° C. for about 30 minutes, detached from its support, treated with water and squeezed out four times and steeped after the last time in a silicone emulsion as described in Example 1(a). The foil is then dried in a circulating air drying cupboard at about 60° C. The permeability of the foil to water vapor is 1.5 mg./cm.²/h.

Example 11

About 125 parts of the 26.6% polyurethane-urea solution in dimethyl formamide obtained in method a1 and a mixture of about 17 parts of a 57% aqueous polyurethane dispersion obtained in method b5, about 3 parts of water and about 93 parts of dimethylformamime are stirred together. After about 2 hours, the outflow viscosity of the solution is 10 to 11 minutes (Ford viscometer, 20° C., 6 mm. nozzle). A foil is prepared from this isolution as in Example 10 by gelling and steeping in water but without the after-treatment with the silicone emulsion. The permeability of the white foil to water vapor is 1.0 mg./cm.$^2$/h.

Example 12

A mixture of about 32 parts of a 41.7% aqueous polyurethane dispersion obtained in method b7 and about 101 parts of dimethylformamide is carefully stirred into about 200 parts of the 26.6% polyurethane-urea solution in dimethylformamide obtained in a method a1. The outflow viscosity of the finished mixture is 6 to 7 minutes (Ford viscometer, 6 mm. nozzle, 20° C.). A foil is prepared as in Example 11 but the gelling time is about one hour. The dry film (0.3 mm. in thickness) has a permeability to water vapor of 6 mg./cm.$^2$/h.

Example 13

About 100 parts of the 26.6% solution of polyurethane-urea obtained in method a1 are carefully stirred together with a mixture of about 23 parts of a 50.2% polyurethane dispersion obtained in method b6 and about 49 parts of dimethylformamide. A dispersion of about 12 parts (=100% based on polyurethane 66) of the tanning agent of Example 1(b) in about 50 parts by weight of dimethylformamide is stirred into this solution. When this solution has been left to stand for about 17 hours at from about 24° to about 28° C., briefly stirred and then degasified in vacuo (20 mm. Hg), it is found to have an outflow viscosity of 1½ minutes (Ford viscometer, 6 mm. nozzle). This solution is poured onto a glass plate (20 g. polyurethane solids per square meter), gelled for about 30 minutes in a current of air (0.75 atmosphere above atmospheric pressure at point of entry) at about 22° C. and 90% to 94% relative humidity, and is left in water for about 100 minutes to coagulate and soak (detached from glass plate after about 10 minutes). The white foil is then squeezed out four times and dipped in water between squeezings. It is then stretched over a board and dried in a current of air at about 50° C. The permeability to water vapor of a foil of 0.3 mm. thickness is 6 mg./cm.$^2$/h.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for producing microporous sheeting permeable to water vapor, which comprises dissolving to form a solution from about 90 to about 70 parts by weight of (A) a polyurethane urea having substantially no free NCO groups and from about 10 to about 30 parts by weight of (B) a high molecular weight substantially linear cationic polyurethane having substantially no free NCO groups in (C) a water-soluble strongly polar solvent for the polyurethane urea (A), the solvent having a boiling point above about 100° C., said solution containing (E) from about 0.5 to above 7% by weight, based on the total solution, of water to yield a mixture (D), shaping mixture (D) and washing the solvent from the resulting product.

2. Process according to claim 1, wherein the shaped mixture (D) is gelled by exposure to moist air prior to washing out the solvent.

3. The process of claim 1, wherein the resulting product is treated with an aqueous solution of at least about 2.5% by dry weight of a synthetic anionic tanning agent, based on the dry weight of (B) after washing the solvent from the product.

4. The process of claim 1, wherein (A) and (B) are dissolved in from about 200 to about 2000 parts by weight of (C) to form a solution having a viscosity of from about 1 to about 30 minutes, measured in a Ford viscometer having a 6 mm. outflow nozzle at 20° C.

5. Process according to claim 1, wherein from about 90 to about 70 parts by weight of one or more polyurethane ureas (A) and from about 10 to about 30 parts by weight of the linear cationic polyurethane (B), (B) being in the form of an aqueous dispersion, are dissolved in about 200 to 2000 parts by weight of the solvent (C), so that the mixture (D) formed contains from about 0.5 to about 7% by weight of water, shaping the mixture (D) and washing out the solvent.

6. The process of claim 1, wherein the solvent is washed from shaped mixture (D) with a mixture of a non-solvent and the solvent in baths of decreasing solvent concentration.

7. The process of claim 6, wherein the last bath is substantially pure non-solvent.

8. The process of claim 6, wherein the non-solvent is water.

9. The process of claim 1 wherein the shaped mixture (D) is gelled by treatment with a solvent/non-solvent mixture prior to washing out the solvent.

10. The process of claim 1 wherein the resulting product is dried.

11. A process for producing microporous sheeting permeable to water vapor, which comprises dissolving to form a solution from about 90 to about 70 parts by weight of (A) a polyurethane urea having substantially no free NCO groups and from about 10 to about 30 parts by weight of (B) a high molecular weight substantially linear cationic polyurethane having substantially no free NCO groups in (C) a water-soluble strongly polar solvent for the polyurethane urea (A), the solvent having a boiling point above about 100° C., said solution containing (E) from about 0.5 to about 7 percent by weight, based on the total solution, of water to yield a mixture (D), adding at least about 2.5 percent by dry weight of a synthetic anionic tanning agent, based on the dry weight of (B), to mixture (D), shaping mixture (D) and washing the solvent from the resulting product.

References Cited

UNITED STATES PATENTS

| 3,100,721 | 8/1963 | Holden | 117—135.5 |
| 3,180,853 | 4/1965 | Peters | 260—77.5 |
| 3,294,752 | 12/1966 | Wilkinson | 260—77.5 |
| 3,000,757 | 9/1961 | Johnson et al. | 117—63 |
| 3,418,198 | 12/1968 | Einstman | 161—84 |
| 3,449,153 | 6/1969 | Saligny et al. | 117—63 |

FOREIGN PATENTS

| 195,581 | 4/1965 | Sweden | 260—77.5UX |
| 1,066,488 | 4/1967 | Great Britain | 260—77.5UX |

DONALD E. CZAJA, Primary Examiner

H. S. COCKERAM, Assistant Examiner

U.S. Cl. X.R.

117—63, 135.5; 260—77.5